United States Patent
Yu et al.

(10) Patent No.: US 10,416,499 B2
(45) Date of Patent: Sep. 17, 2019

(54) BACKLIGHT MODULE AND DISPLAY DEVICE

(71) Applicant: Shenzhen China Star Optoelectronics Technology Co., Ltd., Guangdong (CN)

(72) Inventors: Gang Yu, Guangdong (CN); Dehua Li, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 792 days.

(21) Appl. No.: 14/889,282

(22) PCT Filed: Sep. 15, 2015

(86) PCT No.: PCT/CN2015/089584
§ 371 (c)(1),
(2) Date: Nov. 5, 2015

(87) PCT Pub. No.: WO2017/041314
PCT Pub. Date: Mar. 16, 2017

(65) Prior Publication Data
US 2018/0173031 A1    Jun. 21, 2018

(30) Foreign Application Priority Data
Sep. 9, 2015 (CN) .......................... 2015 1 0570021

(51) Int. Cl.
G02F 1/1339 (2006.01)
F21V 8/00 (2006.01)
G02F 1/1333 (2006.01)
G02F 1/1335 (2006.01)

(52) U.S. Cl.
CPC .......... *G02F 1/1339* (2013.01); *G02B 6/0055* (2013.01); *G02B 6/0088* (2013.01); *G02F 1/133308* (2013.01); *G02F 1/133605* (2013.01); *G02F 1/133608* (2013.01); *G02F 2201/46* (2013.01)

(58) Field of Classification Search
CPC .................................................. G02F 1/133608
USPC .................................................. 362/600–634
See application file for complete search history.

(56) References Cited

U.S. PATENT DOCUMENTS

2013/0208504 A1* 8/2013 Huang .............. G02F 1/133608
                                                                362/609
2014/0112021 A1* 4/2014 Wang ................... G02B 6/0088
                                                                362/633

* cited by examiner

Primary Examiner — William J Carter
(74) Attorney, Agent, or Firm — Mintz Levin Cohn Ferris Glovsky and Popeo, P.C.; Kongsik Kim; Jhongwoo Jay Peck

(57) ABSTRACT

A backlight module, which includes: a backplane; a reflector sheet, a light guide plate, and an optical diaphragm group, which are sequentially stacked on the backplane; and multiple connectors disposed at a border of the backlight module, wherein the connector having a space block and an upper connection portion connected to an upper surface of the spacer block, the spacer block is disposed between the backplane and the reflector sheet, the upper connection portion is relatively fixed simultaneously to the reflector sheet, the light guide plate, and the optical diaphragm group. A display device is also disclosed.

12 Claims, 4 Drawing Sheets

BACKLIGHT MODULE AND DISPLAY DEVICE

CROSS-REFERENCE TO RELATED APPLICATION

This application is the U.S. national phase of PCT Application No. PCT/CN2015/089584 filed on Sep. 15, 2015, which claims priority to CN Patent Application No. 201510570021.1 filed on Sep. 9, 2015 the disclosures of which are incorporated in their entirety by reference herein.

BACKGROUND OF THE INVENTION

1. Field of the Invention

The present disclosure relates to a technical field of a liquid crystal display, and particularly relates to a backlight module and a display device.

2. The Related Arts

With wide spread application of a liquid crystal display device in various fields, a higher requirement of thinning and bezel narrowing of a liquid crystal display device is put forward by the people, which requires thickness of a liquid crystal display module to be as thin as possible and a bezel of the liquid crystal display module to be as narrow as possible. However, in order to fix various components inside the liquid crystal display device, it usually needs to reserve a space for designing a positioning structure on a separate component, which inevitably increases an entire thickness and width of the liquid display device. Therefore, how to fix the display device without affect the width of the bezel and the thickness of the display device is very important.

SUMMARY OF THE INVENTION

In view of a defect existing in the related art, the present disclosure provides a backlight module and a display device which benefit implementation of thinning and bezel narrowing while fixation is reliable.

In order to achieve the above purpose, the present disclosure adopts the following technical scheme:

A backlight module, which includes: a backplane; a reflector sheet, a light guide plate, and an optical diaphragm group, which are sequentially stacked on the backplane; and multiple connectors disposed at a edge of the backlight module, wherein the connectors comprise a space block and an upper connection portion connected to an upper surface of the spacer block, the spacer block is disposed between the backplane and the reflector sheet, and the upper connection portion is relatively fixed simultaneously to the reflector sheet, the light guide plate, and the optical diaphragm group.

Wherein, the spacer block and the backplane are relatively fixed.

Wherein, the connector further includes a lower connection portion connected to a lower surface of the spacer block, a first through hole is disposed in a periphery of the backplane, and the lower connection portion is disposed through the first through hole.

Wherein, a first lug, a second lug, and a third lug are respectively disposed convexly in peripheries of the reflector sheet, the light guide plate, and the optical diaphragm group, and the upper connection portion simultaneously disposed through the first lug, the second lug and the third lug.

Wherein, a second through hole, a notch, and a third through hole corresponding to the upper connection portion are respectively disposed in the first lug, the second lug, and the third lug.

Wherein, the upper connection portion is a convex column.

Wherein, the spacer block is adhered to the reflector sheet.

Or, the upper connection portion comprises a first plugging portion and a second plugging portion extending sequentially from the spacer block, and a hooking portion protruding from the first plugging portion towards the spacer block; the first plugging portion and the second plugging portion are respectively plugged onto the light guide plate and the optical diaphragm group; and the hooking portion is hooked onto the reflector sheet.

Wherein an avoidance gap for insertion of the reflector sheet is formed between the first plugging portion and the spacer block, and the spacer block comprises an inclined guide surface which is used to guide the reflector sheet to be inserted into the avoidance gap.

Another purpose of the present disclosure is to provide a display device, which includes a front bezel, a display panel, and the above backlight module, wherein the display panel is disposed on the backlight module, the front bezel is disposed on an external surface of the display panel.

By disposing multiple connectors at the edge of the backlight module and simultaneously connecting the reflector sheet, the light guide plate, and the optical diaphragm group using the connector, and simultaneously by spacing the reflector sheet, the light guide plate, and the optical diaphragm group from the backplane further through the spacer block on the connector probably, the present disclosure benefits reducing a space occupied by a positioning mechanism of the reflector sheet, the light guide plate, and the optical diaphragm group, benefits an ultra-thin design and an ultra-narrow bezel design of the display device, and improves assembly efficiency of a product.

DETAILED DESCRIPTION OF THE PREFERRED EMBODIMENTS

In order to make a purpose, a technical scheme, and an advantage of the present disclosure more apparent and clear, the present disclosure is further illustrated below in detail by taking in conjunction with the accompanying drawings and embodiments. It should be understood that, the particular embodiment described herein is only used to explain the present disclosure, and is not used to limit the present disclosure.

Embodiment 1

Figure 1:
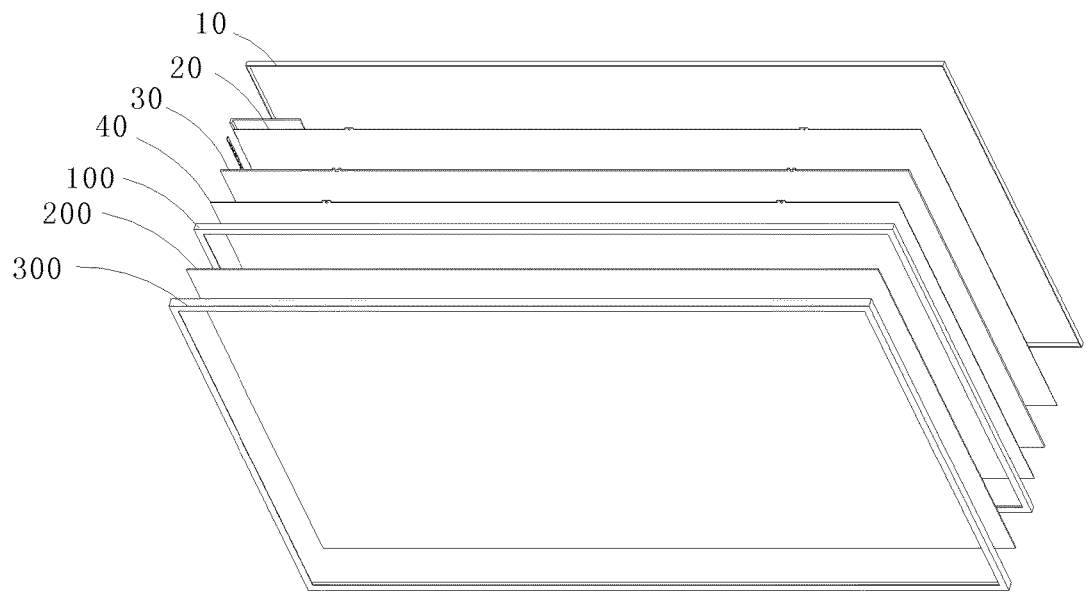
FIG. 1 is a schematic structure view of a display device of Embodiment 1 of the present disclosure.

With reference to FIG. 1, a display device of the present disclosure includes a mold frame 100, a front frame 200, a display panel 300, a backplane 10, a reflector sheet 20, a light guide plate 30, and an optical diaphragm group 40, wherein the mold frame 100, and the backplane 10, the reflector sheet 20, the light guide plate 30 and the optical diaphragm group 40 inside the mold frame 100 constitute a part of the backlight module, the display plane 300 is attached to the mold frame 100, the front frame 200 is disposed on an external surface of the display panel 300 to play a function of protection and position restriction.

Figure 2:
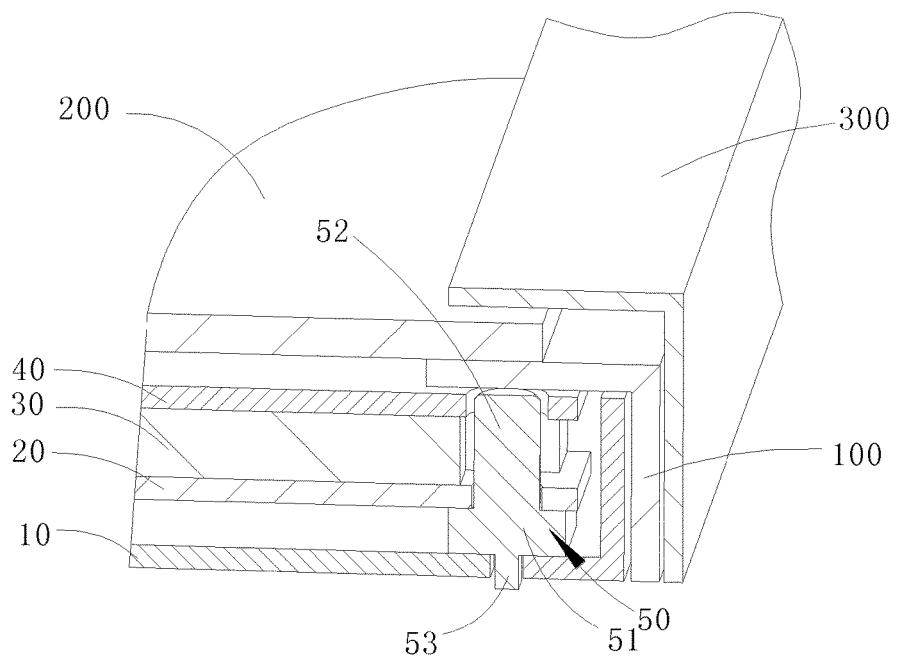
FIG. 2 is a partial sectional view of the display device of Embodiment 1 of the present disclosure.
Figure 3:
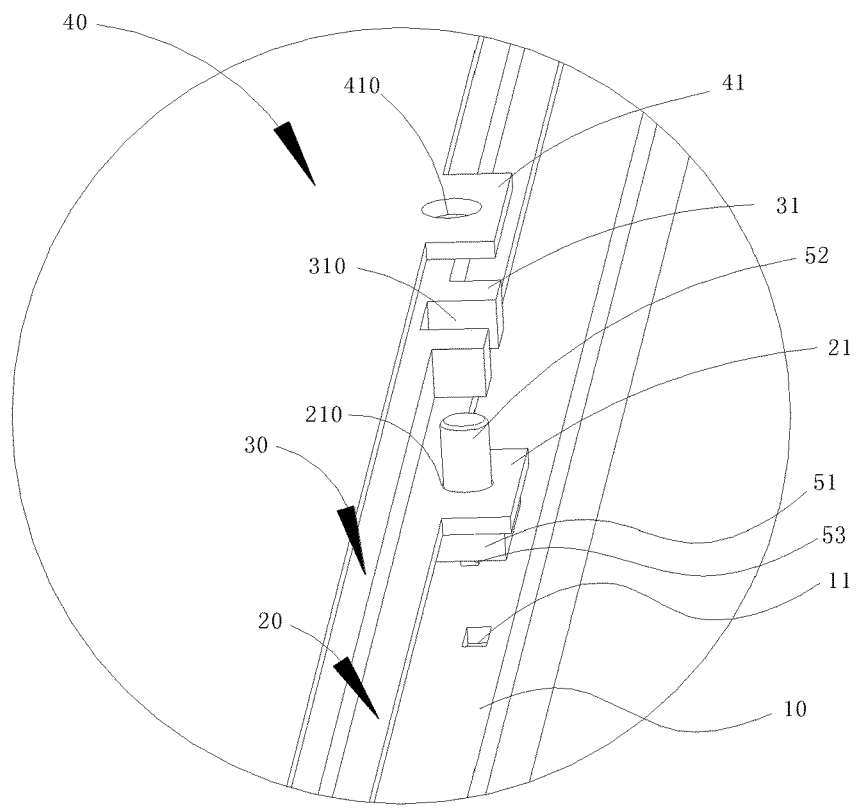
FIG. 3 is a partial enlarged view of an exploded structure view of the display device of Embodiment 1 of the present disclosure.

Taking in conjunction with what is shown in FIGS. 2 and 3, in the backlight module, the reflector sheet 20, the light guide plate 30, and the optical diaphragm group 40 are sequentially stacked on the backplane 10, multiple connectors 50 are fixed at a border of the backlight module in an interval; the connector 50 includes a spacer block 51, an upper connection portion 52 connected to an upper surface of the spacer block 51, and a lower connection portion 53 connected to a lower surface of the spacer block 51; the spacer block 51 is disposed between the backplane 10 and the reflector sheet 20; a first through hole 11 is disposed in a periphery of the backplane 10; the lower connection portion 53 is disposed in the first though hole 11; the upper connection portion 52 is relatively fixed simultaneously to the reflector sheet 20, the light guide plate 30, and the optical diaphragm group 40.

Through this disposition, the reflector sheet 20, the light guide plate 30, and the optical diaphragm group 40 are connected simultaneously through an upper part of the connector 50; a lower part of the connector 50 is relatively fixed to the backplane 10; the spacer block 51 is disposed between the backplane 10 and the reflector sheet 20, to play a function of spacing the reflector sheet 20 and the backplane 10; a cooling fin may further be disposed in a gap between the reflector sheet 20 and the backplane 10 to perform thermal dissipation on a backlight source; it only needs to disposed this connector 50 around the border of the backlight module, to implement fixation of the backlight module, which benefits reduction of the space occupied by a positioning mechanism of the reflector sheet, the light guide plate, and the optical diaphragm group, benefits design of an ultra-thin design and an ultra-narrow bezel design of the display device, and can improve an assembly efficiency of a product.

Particularly, both the upper connection portion 52 and the lower connection portion 53 of this embodiment are a convex column; a first lug 21, a second lug 31, and a third lug 41 are respectively disposed in peripheries of the reflector sheet 20, the light guide plate 30, and the optical diaphragm group 40; a second through hole 210, a notch 310, and a third through hole 410 corresponding to the upper connection portion 52 are respectively disposed on the first lug 21, the second lug 31, and the third lug 41; the upper connection portion 52 is simultaneously disposed through the second through hole 210, the notch 310, and the third through hole 410.

A double-faced adhesive is disposed between the first lug 21 and the spacer block 51, and a next assembling operation may be performed after adhering the spacer block 51 to the reflector sheet 20 when assembling.

Particularly when assembling, first, the spacer block 51 of the connector 50 is adhered to the reflector sheet 20, the upper connection portion 52 is inserted into the second through hole 210 of the reflector sheet 20, and the lower connection portion 53 of the connector 50 is inserted into the first through hole 11 of the backplane 10; then the light guide plate 30 and the optical diaphragm group 40 are sequentially assembled, the notch 310 of the light guide plate 30 and the third through hole 410 of the optical diaphragm group 40 is sleeved on the upper connection portion 52; finally the mold frame 100, the display panel 300, and the front frame 200 are assembled; the backplane 10 may be taken as an assembly platform, greatly improving the assembly efficiency.

Because all the first lug 21, the second lug 31, and the third lug 41 for disposing the connector 50 on the backlight module are disposed in the peripheries of the corresponding components, each connector 50 is simultaneously disposed through the corresponding lug, the bezel of the display device may not be greatly increased; simultaneously, the reflector sheet 20, the light guide plate 30, and the optical diaphragm group 40 are all tightly attached together; the gap between the backplane 10 and the reflector sheet 20 may be used to mount a cooling pin, and a size of this gap may be set by adjusting thickness of the spacer block 51, making a structure of the display device compact and the thickness thereof as thin as possible, facilitating a thinning design of the display device.

Embodiment 2

Figure 4:
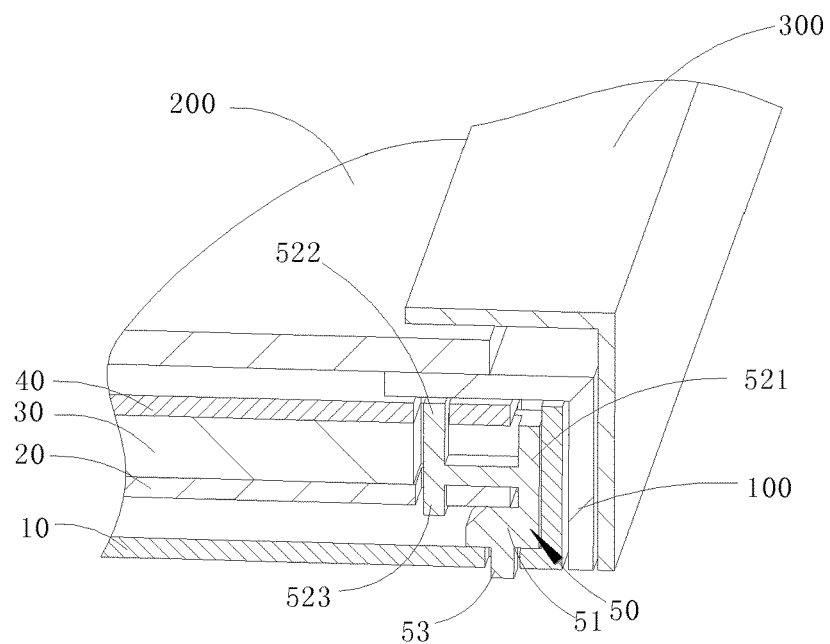
FIG. 4 is a partial sectional view of a display device of Embodiment 2 of the present disclosure.
Figure 5:
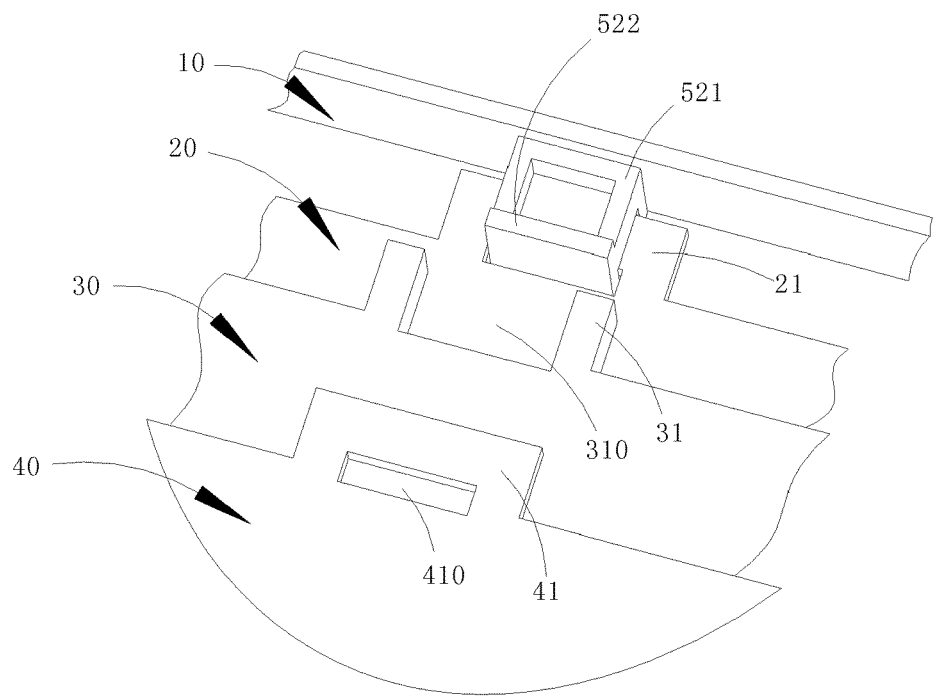
FIG. 5 is a partial enlarged view of an exploded structure view of the display device of Embodiment 2 of the present disclosure.
Figure 6:
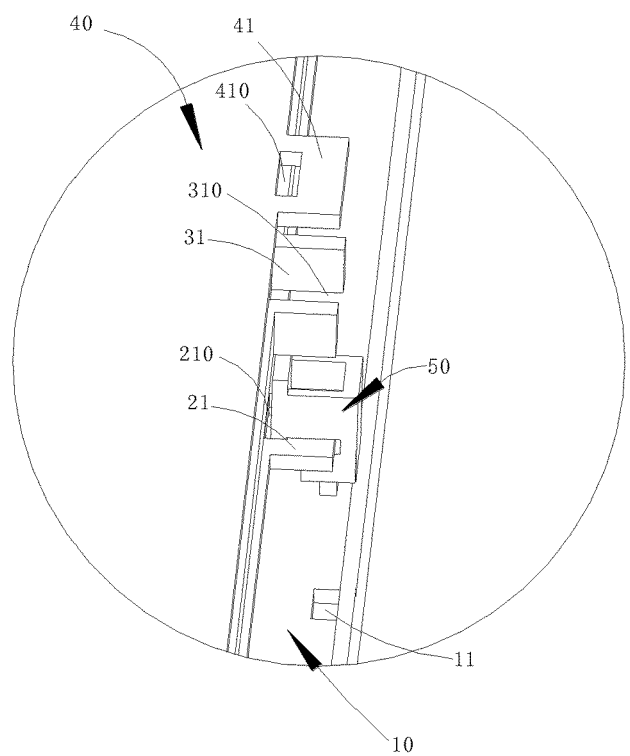
FIG. 6 is another partial enlarged view of an exploded structure view of the display device of Embodiment 2 of the present disclosure.

As shown in FIG. 4-6, different from Embodiment 1, the structure of the connector 50 of this embodiment is different. The upper connection portion 52 of this embodiment includes a first plugging portion 521, a second plugging portion 522 extending sequentially from the spacer block 51, and a hooking portion 523 protruding from the first plugging portion 521 towards the spacer block 51; the first plugging portion 521 and the second plugging portion 522 are respectively plugged onto the light guide plate 30 and the optical diaphragm group 40; the hooking portion 523 is hooked onto the reflector sheet 20.

Figure 7:
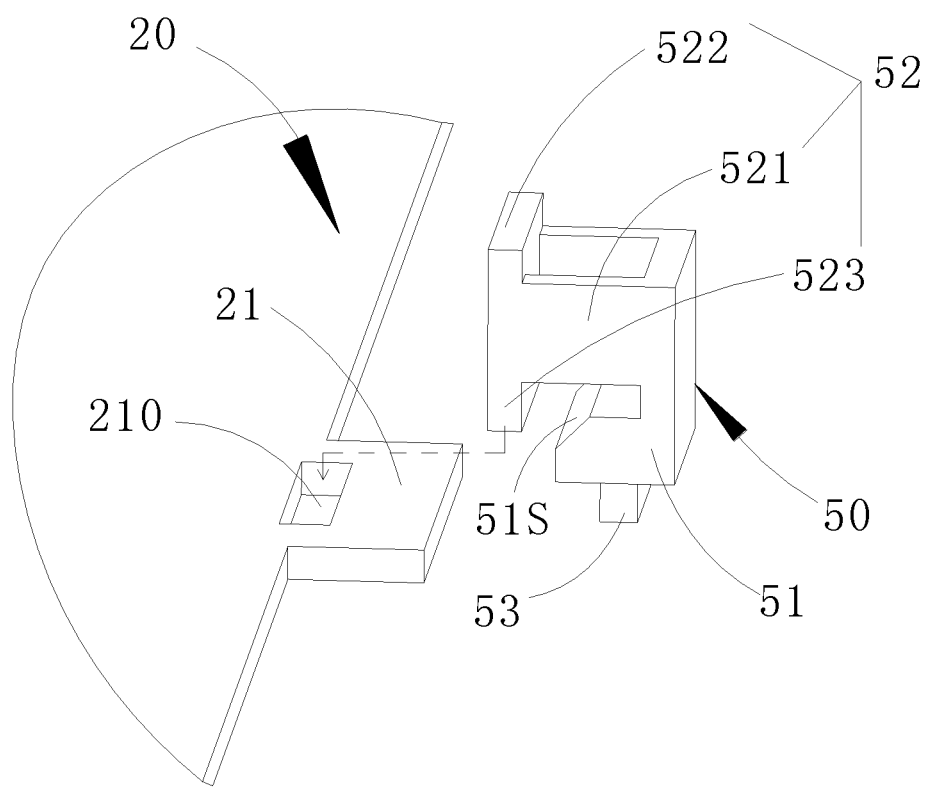
FIG. 7 is a view of an installation state of a connector of Embodiment 2 of the present disclosure.

In combination with FIG. 7, an avoidance gap for insertion of the reflector sheet 20 is formed between the first plugging portion 521 and the spacer block 51; the spacer block 51 includes an inclined guide surface 51S, the guide surface 51S is specifically formed by a chamfering process which is performed at a side of the spacer block 51 adjacent to the hooking portion 523, the surface 51S may be used to guide the reflector sheet 20 to be inserted into the avoidance gap, reducing interference between the spacer block 51 and the first lug 21 of the reflector sheet 20. The first plugging portion 521 of this embodiment has a square hollow tube structure, the second plugging portion 522 is only a side wall of this hollow tube; the third lug 41 and the third through hole 410 on the optical diaphragm group 40 cooperating with the second plugging portion 522 may be made smaller, to facilitate bezel narrowing.

All those described above are only particular embodiments of the present application, it should be indicated that with respected to those of ordinary skill in the art, several improvements and modifications may further be made without departing from the principle of the present application, these improvements and modifications should also be regarded as the protection scope of the present application.

What is claimed is:
1. A backlight module, comprising:
 a backplane;
 a reflector sheet, a light guide plate, and an optical diaphragm group, which are sequentially stacked on the backplane; and
 multiple connectors disposed at a edge of the backlight module, wherein the connectors comprise a spacer block and an upper connection portion having a cylindrical shape and protruding from an upper surface of the spacer block, wherein a spacer block is disposed between the backplane and the reflector sheet, and the reflector sheet is coupled to the upper connection portion from above, wherein the upper connection portion has a substantially constant cross-section along a length thereof and is coupled to all of the reflector sheet, the light guide plate, and the optical diaphragm group, wherein a first lug, and a second lug, and a third lug convexly protrude from peripheries of the reflector sheet, the light guide plate, and the optical diaphragm group, respectively, and wherein the upper connection portion is disposed through a hole or a notch formed in each of the first lug, the second lug, and the third lug, and a diameter of the hole or a width of the notch corresponds to a diameter of the cross-section of the upper connection portion.

2. The backlight module of claim 1, wherein the spacer block and the backplane are relatively fixed.

3. The backlight module of claim 1, wherein the connector further comprises a lower connection portion connected to a lower surface of the spacer block, a first through hole is disposed in a periphery of the backplane, and the lower connection portion is disposed through the first through hole.

4. The backlight module of claim 1, wherein a second through hole, a notch, and a third through hole corresponding to the upper connection portion are respectively disposed in the first lug, the second lug, and the third lug.

5. The backlight module of claim 1, wherein the upper connection portion is a convex column.

6. The backlight module of claim 5, wherein the spacer block is adhered to the reflector sheet.

7. A backlight module, comprising:
a backplane;
a reflector sheet, a light guide plate, and an optical diaphragm group, which are sequentially stacked on the backplane; and
multiple connectors disposed at a edge of the backlight module, wherein the connectors comprise a spacer block and an upper connection portion connected to an upper surface of the spacer block, the spacer block is disposed between the backplane and the reflector sheet, and the upper connection portion is coupled to all of the reflector sheet, the light guide plate, and the optical diaphragm group, wherein the upper connection portion comprises a first plugging portion extending from an upper surface of the spacer block, a second plugging portion extending from the first plugging portion, and a hooking portion protruding from the first plugging portion towards the spacer block, wherein a first lug, a second lug, and a third lug convexly protrude from peripheries of the reflection sheet, the light guide plate, and the optical diaphragm group, respective, and wherein the first plugging portion is coupled to the light guide plate through the second lug, the second plugging portion is coupled to the optical diaphragm group from below through a first through hole of the third lug, and the hooking portion is hook-coupled to the reflector sheet from above through a second through hole of the first lug.

8. The backlight module of claim 7, wherein the first plugging portion has a square hollow tube structure, the second plugging portion is only a side wall of this hollow tube.

9. The backlight module of claim 7, wherein an avoidance gap for insertion of the reflector sheet is formed between the first plugging portion and the spacer block, and the spacer block comprises an inclined guide surface which is used to guide the reflector sheet to be inserted into the avoidance gap.

10. A display device, comprising:
a front bezel;
a display panel; and
a backlight module,
wherein the display panel is disposed on the backlight module, the front bezel is disposed on an external surface of the display panel, wherein the backlight module comprises a backplane; a reflector sheet, a light guide plate, and an optical diaphragm group, which are sequentially stacked on the backplane; and multiple connectors disposed at a edge of the backlight module, wherein the connectors comprise a spacer block and an upper connection portion connected to an upper surface of the spacer block, the spacer block is disposed between the backplane and the reflector sheet, the upper connection portion is coupled to all of the reflector sheet, the light guide plate, and the optical diaphragm group, wherein the upper connection portion comprises a first plugging portion extending from an upper surface of the spacer block, a second plugging portion extending from the first plugging portion, and a hooking portion protruding from the first plugging portion towards the spacer block, wherein a first lug, a second lug, and a third lug convexly protrude from peripheries of the reflector sheet, the light guide plate, and the optical diaphragm group, respectively, and wherein the first plugging portion is coupled to the light guide plate through the second lug, the second plugging portion is coupled to the optical diaphragm group from below through a first through hole of the third lug, and the hooking portion is hook-coupled to the reflector sheet from above through a second through hole of the first lug.

11. The display device of claim 10, wherein the first plugging portion has a square hollow tube structure, the second plugging portion is only a side wall of this hollow tube.

12. The display device of claim 10, wherein an avoidance gap for insertion of the reflector sheet is formed between the first plugging portion and the spacer block, and the spacer block comprises an inclined guide surface which is used to guide the reflector sheet to be inserted into the avoidance gap.

* * * * *